(12) United States Patent
Park et al.

(10) Patent No.: US 9,684,943 B2
(45) Date of Patent: Jun. 20, 2017

(54) MULTI CORE GRAPHIC PROCESSING DEVICE

(71) Applicant: SAMSUNG ELECTRONICS CO., LTD., Suwon-si, Gyeonggi-Do (KR)

(72) Inventors: Hyeon-Su Park, Yongin-si (KR); Yun-Seok Lee, Hwaseong-si (KR); Nyeong-Kyu Kwon, Daejeon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 413 days.

(21) Appl. No.: 14/286,678

(22) Filed: May 23, 2014

(65) Prior Publication Data

US 2014/0354656 A1    Dec. 4, 2014

(30) Foreign Application Priority Data

May 28, 2013    (KR) .................. 10-2013-0060414

(51) Int. Cl.
  *G06T 1/20* (2006.01)
(52) U.S. Cl.
  CPC ............ *G06T 1/20* (2013.01); *G06T 2210/52* (2013.01); *G09G 2370/045* (2013.01)
(58) Field of Classification Search
  CPC .... G06T 1/20; G06T 2210/52; G09G 2370/45
  See application file for complete search history.

(56) References Cited

U.S. PATENT DOCUMENTS

| 5,675,826 A | 10/1997 | Manze et al. |
| 5,841,444 A | 11/1998 | Mun et al. |
| 6,229,571 B1 | 5/2001 | Sato |
| 7,453,519 B2 | 11/2008 | Kubota et al. |
| 8,085,273 B2 * | 12/2011 | Bakalash .............. G06F 9/5066 345/501 |
| 8,698,814 B1 * | 4/2014 | Van Dyke .............. G09G 5/363 345/502 |
| 2008/0074350 A1 | 3/2008 | Beon et al. |
| 2009/0161011 A1 | 6/2009 | Hurwitz et al. |
| 2010/0128169 A1 | 5/2010 | Yi et al. |
| 2011/0134315 A1 | 6/2011 | Levy et al. |
| 2012/0176536 A1 | 7/2012 | Levy et al. |

FOREIGN PATENT DOCUMENTS

| JP | 2009-278473 | 11/2009 |
| JP | 2010-021814 | 1/2010 |
| JP | 2012-032627 | 2/2012 |
| KR | 10-2007-0076672 | 7/2007 |
| KR | 10-0951465 | 4/2010 |

* cited by examiner

*Primary Examiner* — Robert Craddock
(74) *Attorney, Agent, or Firm* — F. Chau & Associates, LLC

(57) ABSTRACT

A multi core graphic processing device includes a first graphic core that processes a first segment of a graphic frame divided into a plurality of segments and generates a first local decision that defines a scene property of the first segment, a second graphic core that processes a second segment of the graphic frame different from the first segment and generates a second local decision that defines a scene property of the second segment, and a global decision unit that receives the first local decision and the second local decision from the first graphic core and the second graphic core, and selects one of the received first local decision and second local decision as a global decision.

10 Claims, 11 Drawing Sheets

MULTI CORE GRAPHIC PROCESSING DEVICE

CROSS-REFERENCE TO RELATED APPLICATION

This application claims priority under 35 U.S.C. 119 from Korean Patent Application No. 10-2013-0060414 filed on May 28, 2013 in the Korean Intellectual Property Office, and all the benefits accruing therefrom, the contents of which are herein incorporated by reference in their entirety.

BACKGROUND

1. Technical Field

Embodiments of the present disclosure are directed to a multi core graphic processing device.

2. Discussion of the Related Art

A graphic processing device is a device that processes graphic data. For example, a frame rate converter (FRC) may convert and output a frame rate of a sequence of graphic frames. A graphic processing device may be provided as a multi core graphic processing device that includes a plurality of processor cores. A multi core graphic processing device may divide a graphic frame into a plurality of segments and respectively process the plurality of segments by the plurality of processor cores.

SUMMARY

Embodiment of the present disclosure provide a multi core graphic processing device, which can prevent boundary discontinuities from occurring between a plurality of segments of a graphic frame by equally processing the plurality of segments according to a global decision.

The above and other objects of the present disclosure will be described in or be apparent from the following description of exemplary embodiments.

According to an aspect of the present disclosure, there is provided a multi core graphic processing device including a first graphic core that processes a first segment of a graphic frame divided into a plurality of segments and generates a first local decision that defines a scene property of the first segment, and a second graphic core that processes a second segment of the graphic frame different from the first segment and generates a second local decision that defines a scene property of the second segment, and a global decision unit that receives the first local decision and the second local decision from the first graphic core and the second graphic core, and selects one of the received first local decision and second local decision as a global decision.

According to another aspect of the present disclosure, there is provided a multi core graphic processing device including a frame divide module that divides an indexed graphic frame into a plurality of segments, a plurality of graphic cores, each of which receives one of the plurality of segments of the graphic frames and processes the received segment, and a global decision unit that generates a global decision for the graphic frame, wherein each of the plurality of graphic cores generates a local decision that defines a scene property of the received segment, transmits the generated local decision to the global decision unit, receives the global decision, and processes the received segment based on the received global decision.

According to another aspect of the present disclosure, there is provided a method of processing a graphic frame that includes receiving a plurality of segments divided from a graphic frame, generating a global decision from at least one of the plurality of segments of the graphic frame, inputting the global decision into a plurality of local process units, wherein each of the plurality of local process units is associated with one of the plurality of segments, and processing each segment of the plurality of segments by the respective associated local process unit according to the global decision.

DETAILED DESCRIPTION OF EXEMPLARY EMBODIMENTS

Embodiments of the present disclosure will now be described more fully hereinafter with reference to the accompanying drawings, in which exemplary embodiments of the disclosure are shown. Embodiments of the disclosure may, however, be embodied in different forms and should not be construed as limited to the embodiments set forth herein. The same reference numbers may indicate the same components throughout the specification.

It will also be understood that when a layer is referred to as being "on" another layer or substrate, it can be directly on the other layer or substrate, or intervening layers may also be present.

Hereinafter, embodiments of the present disclosure will now be described with reference to the accompanying drawings.

The following description will be made with regard to a frame rate converter (FRC) as an example of a multi core graphic processing device, but embodiments of the present disclosure are not limited thereto. The present disclosure may be embodied in various applications, including multi core devices for processing graphic data. Here, the graphic data may include video data and image data.

Figure 1:
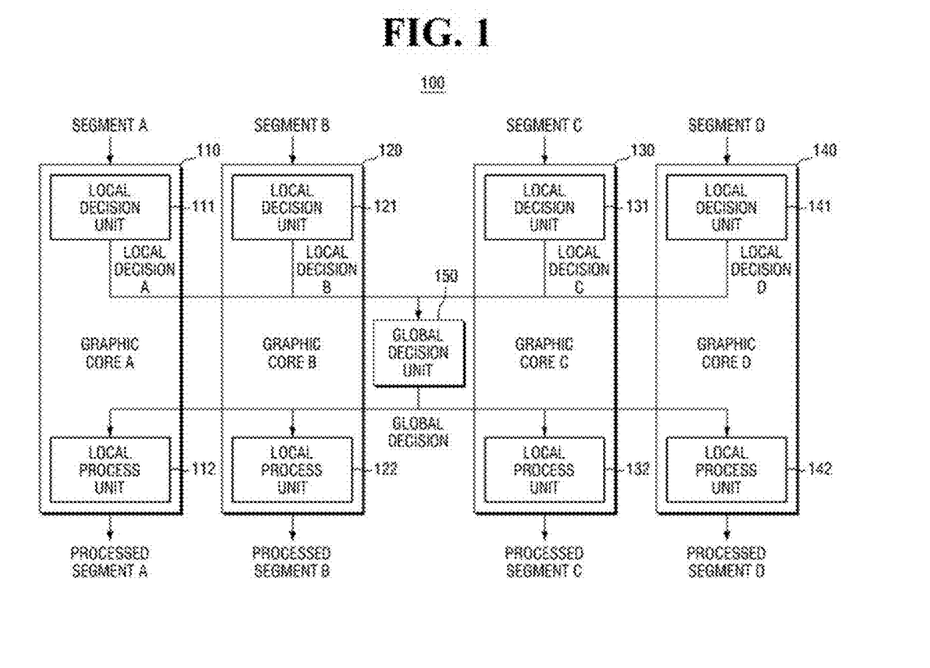
FIG. 1 is a block diagram that illustrates a multi core graphic processing device according to an embodiment of the present disclosure.

FIG. 1 is a block diagram that illustrates a multi core graphic processing device according to an embodiment of the present disclosure.

Referring to FIG. 1, a multi core graphic processing device 100 according to an embodiment of the present disclosure may be a quad core graphic processing device that includes a plurality of graphic cores. The plurality of graphic cores may include a first graphic core 110 (graphic core A), a second graphic core 120 (graphic core B), a third graphic core 130 (graphic core C), and a fourth graphic core 140 (graphic core D). The multi core graphic processing device 100 according to an embodiment of the present disclosure may be, e.g., a dual core graphic processing device, a hexa core graphic processing device, or an octa core graphic processing device, but embodiments of the present disclosure do not limit the number of graphic cores of a multi core graphic processing device to those listed herein.

The multi core graphic processing device 100 may process a graphic frame divided into a plurality of segments (segments A to D). If the graphic frame is provided with a first resolution level, such as ultra-high definition (UD), the plurality of segments (segments A to D) may be provided with a second resolution level, such as high definition (HD). The plurality of graphic cores 110 to 140 may provide graphic processing at the second resolution level.

The plurality of graphic cores 110 to 140 may receive corresponding segments of the plurality of segments (segments A to D) and may output processed segments A to D. The first graphic core 110 may process a first segment (segment A), the second graphic core 120 may process a second segment (segment B), the third graphic core 130 may process a third segment (segment C) and the fourth graphic core 140 may process a fourth segment (segment D).

The multi core graphic processing device 100 may further include a global decision unit 150. The global decision unit 150 may define scene properties of an overall graphic frame. The global decision unit 150 may generate a global decision, and the global decision may include the scene properties of the overall graphic frame.

In an embodiment of the present disclosure, the scene property may refer to characters in the graphic frame. The scene property may be statistically defined based on a scene feature of the graphic frame. The scene feature may indicate particular data detected from the graphic frame. A plurality of different scene properties may be processed according to a plurality of different processing methods.

A global decision may be applied equally to the plurality of segments (segments A to D) that constitute the graphic frame.

The plurality of graphic cores 110 to 140 may include local decision units 111, 121, 131 and 141 that define scene properties of the corresponding segments A to D, respectively, and local processing units 112, 122, 132 and 142 that respectively process the corresponding segments A to D.

The local decision units 111 to 141 of the plurality of graphic cores 110 to 140 may detect or extract information from the corresponding segments A to D and may define the scene properties of the respective segments A to D. As the result, the local decision units 111 to 141 may each generate a local decision, and each local decision may include scene properties of the respective segments A to D. The local decision may include one scene property or may include two or more scene properties.

In an embodiment of the present disclosure, the scene property may include a cadence format, an unstable frame, a fade-in/out, a dissolve, a scene overlap, a sudden change, a flash light effect, panning, a letter box, a subtitle, a still, etc., but embodiments of the present disclosure are not limited thereto.

The first graphic core 110 may generate a first local decision (local decision A), the second graphic core 120 may generate a second local decision (local decision B), the third graphic core 130 may generate a third local decision (local decision C), and the fourth graphic core 140 may generate a fourth local decision (local decision D). The respective local decisions may be the same as or different from each other.

The global decision unit 150 may receive a plurality of local decisions (local decisions A to D) from the plurality of graphic cores 110 to 140. The global decision unit 150 may select one of the received local decisions (local decisions A to D) as a global decision.

In an exemplary embodiment, the global decision unit 150 may select a majority of the equivalent local decisions from the plurality of local decisions (local decisions A to D) as a global decision. For example, when the first to third local decisions A to C are equivalent to each other, and the fourth local decision D differs from the first to third local decisions A to C, the global decision unit 150 may select the first to third local decisions A to C as the global decision.

In another exemplary embodiment, the global decision unit 150 may select a minority of equivalent local decisions from the plurality of local decisions (local decisions A to D) as a global decision. For example, when the first to third local decisions A to C are equivalent to each other, and the fourth local decision D differs from the first to third local decisions A to C, the global decision unit 150 may select the fourth local decision D as the global decision. Here, the minority local decision selected as the global decision may have priority over the remaining local decisions.

Priority may be given to a scene property that changes arithmetic or the logical computations of the overall graphic frame. For example, priority may be given to a cadence format, an unstable frame, or sudden change, but aspects of the present disclosure are not limited thereto. Here, cadence format may refer to a broadcast-standard frame transmission format, unstable frame may refer to a frame with poorly distinguishable scene properties due to a variety of motion vectors (MVs), and sudden change may refer to a frame whose scenes suddenly change.

In such a manner, the global decision unit 150 may collect scene properties of the plurality of segments (segments A to D) and may define the scene properties of the overall graphic frame. The global decision may include a global process method that depends on the scene properties of the overall graphic frame.

Local process units 112 to 142 of the plurality of graphic cores 110 to 140 may process the corresponding segments A to D based on the global decision. For example, the local process units 112 to 142 may convert frame rates of the corresponding segments A to D. Therefore, the plurality of segments (segments A to D) of the graphic frame may be equally processed based on the global process method.

Figure 2:
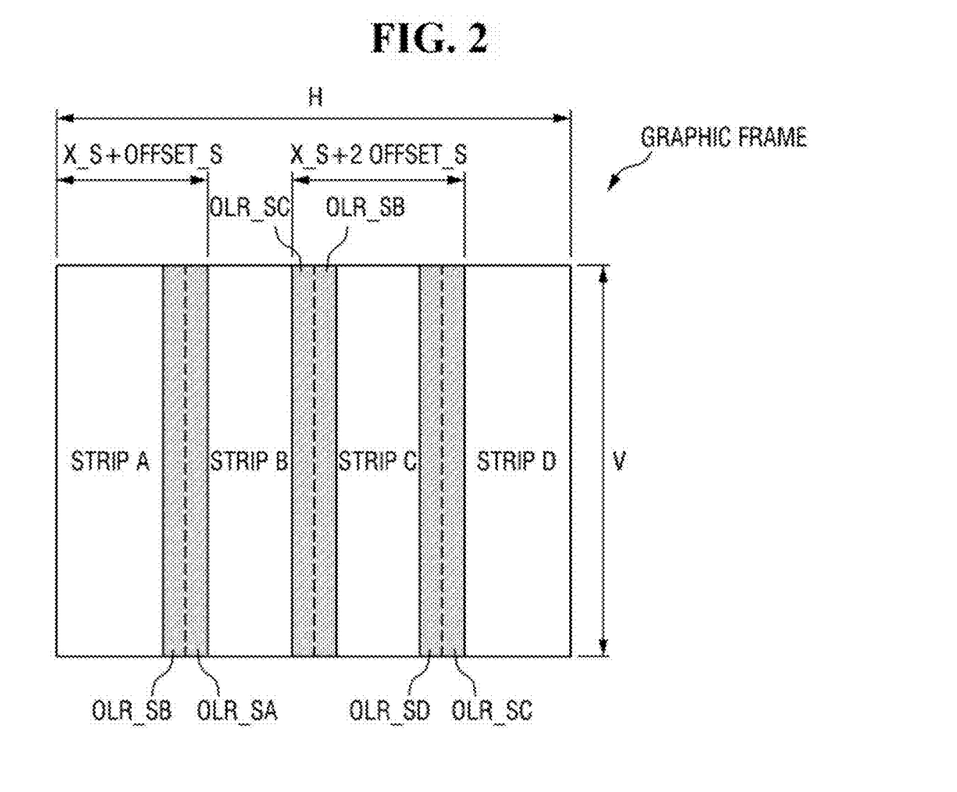
FIG. 2 illustrates a graphic frame divided into a plurality of strips.
Figure 3:
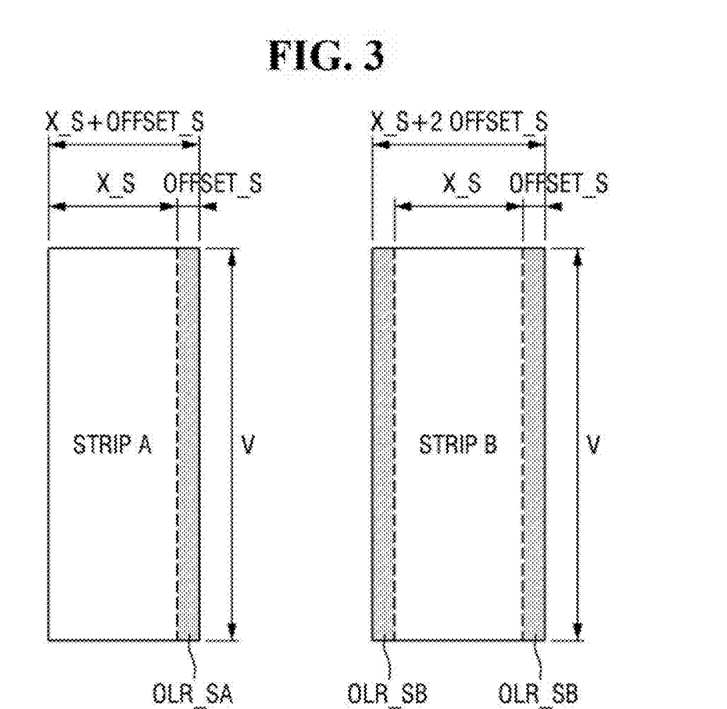
FIG. 3 is a detailed diagram that illustrates individual strips shown in FIG. 2.

FIG. 2 illustrates a graphic frame divided into a plurality of strips and FIG. 3 is a detailed diagram that illustrates individual strips shown in FIG. 2.

Referring to FIG. 2, a graphic frame may be divided into a plurality of strips. The plurality of strips may extend vertically to divide the graphic frame in a horizontal direction. For example, the plurality of strips may include a first strip (strip A) in a peripheral region of the graphic frame, a second strip (strip B) and a third strip (strip C) on the inside of the graphic frame, and a fourth strip (strip D) in a peripheral region of the graphic frame, as shown in FIG. 2. The graphic frame may have a horizontal size of h pixels and a vertical size of v pixels.

Each of the plurality of strips (strip A to strip D) may include a main region and a sub region. Referring to FIG. 3, a sub region OLR_SA of the first strip (strip A) may extend from one side of the main region of the first strip (strip A) into the graphic frame. A sub region OLR_SD of the fourth strip (strip D) may be configured in substantially the same manner as the sub region OLR_SA of the first strip (strip A). In addition, sub regions OLR_SB of the second strip (strip B) may extend in left and right directions from opposite sides of the main region. A sub region OLR_SC of the third strip (strip C) may also be configured in substantially the same manner as the sub region OLR_SB of the second strip (strip B). The sub regions OLR_SA to SD of the plurality of strips (strip A to strip D) may overlap a portion of the main region of an adjacent strip. Each of the main regions of the plurality of strips (strip A to strip D) may have a horizontal size of x_s pixels and each of the sub regions of the plurality of strips (strip A to strip D) may have a horizontal size of offset_s pixels.

The plurality of strips (strip A to strip D) may correspond to the plurality of segments.

Figure 4:
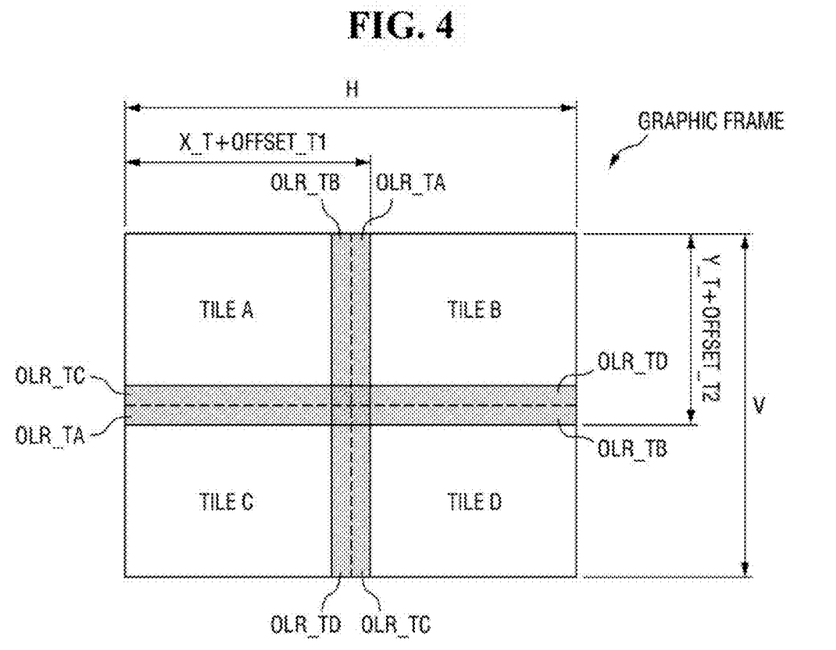
FIG. 4 is a detailed diagram that illustrates a graphic frame divided into a plurality of tiles.
Figure 5:
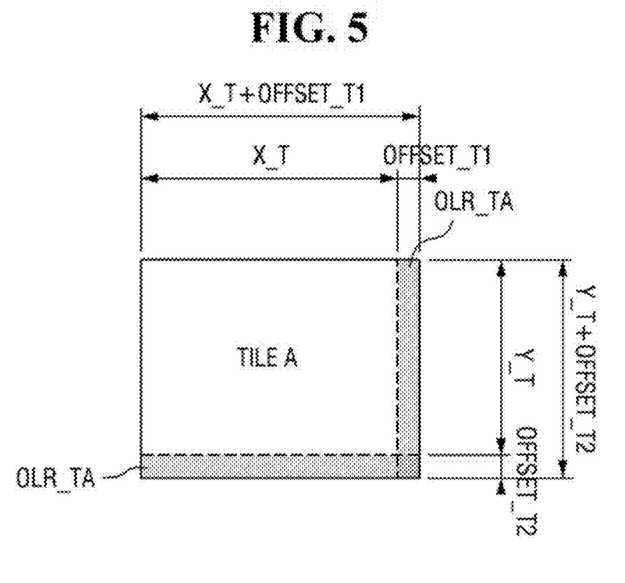
FIG. 5 is a detailed diagram that illustrates individual tiles shown in FIG. 4.

FIG. 4 is a detailed diagram that illustrates a graphic frame divided into a plurality of tiles and FIG. 5 is a detailed diagram that illustrates individual tiles shown in FIG. 4.

Referring to FIG. 4, a graphic frame may be divided into a plurality of tiles. The plurality of tiles may divide the graphic frame in horizontal and vertical directions. For example, the plurality of tiles may include a first tile (tile A), a second tile (tile B), a third tile (tile C), and fourth tile (tile D), as shown in FIG. 4.

Each of the plurality of tiles (tile A to tile D) may include a main region and a sub region.

Referring to FIG. 5, a sub region OLR_TA of the first tile (tile A) of the graphic frame may extend from the main region into an adjacent tile in the horizontal and vertical directions. Sub regions OLR_TB, OLR_TC and OLR_TD of the second tile (tile B), the third tile (tile C) and the fourth tile (tile D), respectively, may also be configured in substantially the same manner as the sub region LR_TA of the first tile (tile A). The sub regions OLR_TA to OLR_TD of the plurality of tiles (tile A to tile D) may overlap a portion of the main region of an adjacent tile. Each of the main regions of the plurality of tiles (tile A to tile D) may have a horizontal size of x_t pixels and a vertical size of y_t pixels. Each of the sub regions OLR_TA to OLR_TD of the plurality of tiles (tile A to tile D) may extend from the main region by a horizontal size of offset_t1 pixels and by a vertical size of offset_t2 pixels.

The plurality of tiles (tile A to tile D) may correspond to the plurality of segments.

In an embodiment of the present disclosure, a graphic frame may be divided into a plurality of strips (strip A to strip D) as shown in FIG. 2 or a plurality of tiles (tile A to tile D) as shown in FIG. 4, but embodiments of the present disclosure are not limited thereto. According to embodiments, the graphic frame may be divided in different types and numbers of segments besides those shown in FIGS. 2 and 4. In addition, the plurality of segments of the graphic frame may or may not include some regions that overlap other segments.

Figure 6:
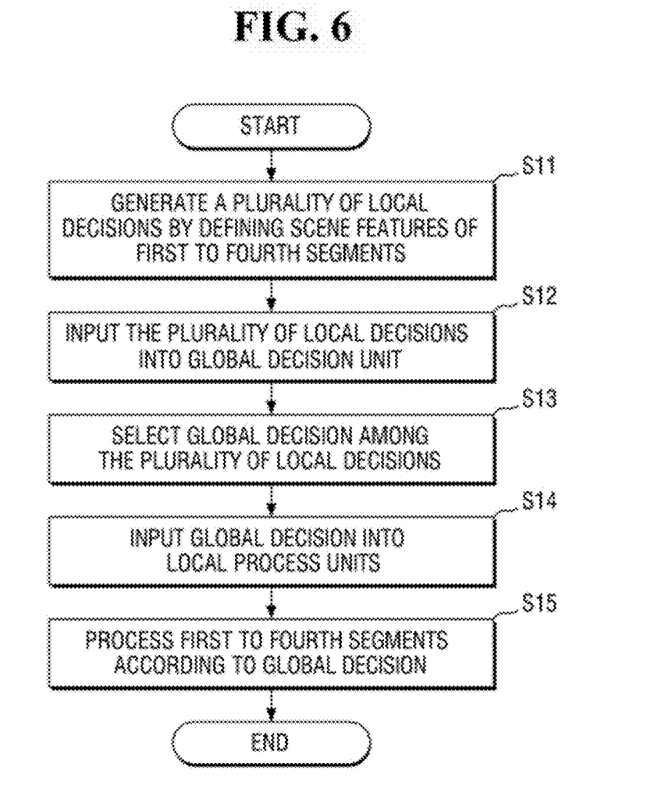
FIG. 6 is a flowchart that illustrates a graphic processing method according to an embodiment of the present disclosure.

Hereinafter, a graphic processing method according to an embodiment of the present disclosure using the multi core graphic processing device 100 shown in FIG. 1 will be described. FIG. 6 is a flowchart illustrating a graphic processing method according to an embodiment of the present disclosure.

Referring to FIG. 6, a graphic processing method according to an embodiment of the present disclosure may include generating a plurality of local decisions (local decision A to local decision D) by defining scene properties of the first to fourth segments (segment A to segment D) (S11). Next, the plurality of local decisions (local decisions A to D) are input to the global decision unit 150 (S12).

Next, the global decision unit 150 selects a global decision from the plurality of local decisions (local decision A to local decision D) (S13). The global decision unit 150 may select a majority of the same local decisions or a minority of local decisions from the plurality of local decisions (local decisions A to D) as the global decision.

Next, the global decision unit 150 inputs the global decision into the local process units 112 to 142 (S14). Next, the local process units 112 to 142 process the first to fourth segments (segment A to segment D) according to the global decision, respectively (S15).

Figure 7:
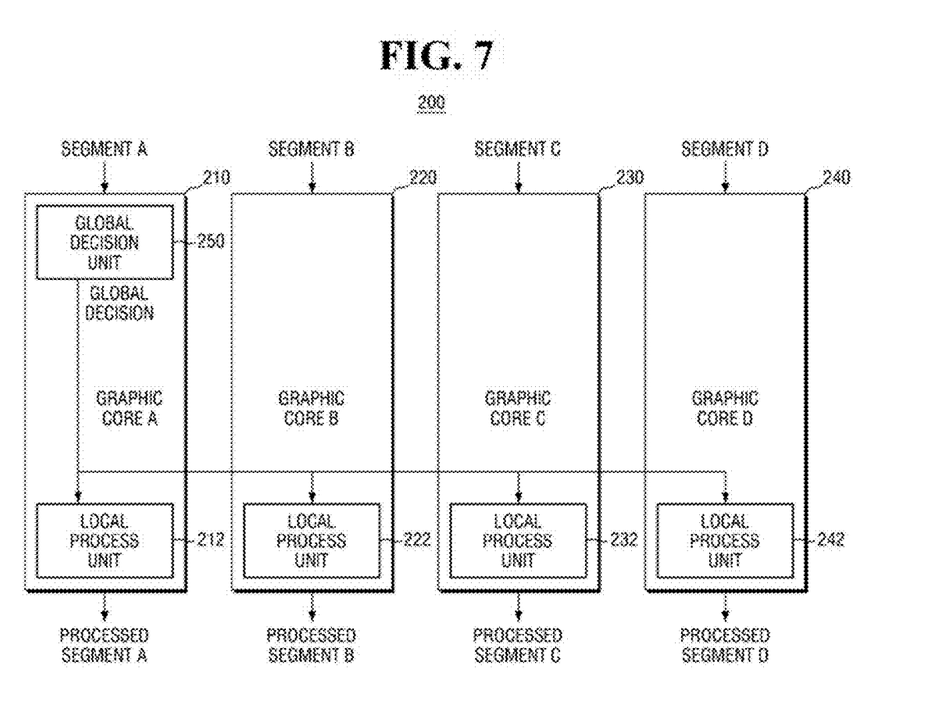
FIG. 7 is a block diagram that illustrates a multi core graphic processing device according to another embodiment of the present disclosure.

FIG. 7 is a block diagram that illustrates a multi core graphic processing device according to another embodiment of the present disclosure. For the sake of convenient explanation, the following description will focus on differences between the multi core graphic processing devices shown in FIGS. 1 and 7.

Referring to FIG. 7, a multi core graphic processing device 200 according to another embodiment of the present disclosure may be a quad core graphic processing device that includes a first graphic core 210 (graphic core A), a second graphic core 220 (graphic core B), a third graphic core 230 (graphic core C), and a fourth graphic core 240 (graphic core D).

The multi core graphic processing device 200 may process a graphic frame divided into a plurality of segments (segments A to D). Each of the plurality of graphic cores 210 to 240 may receive a corresponding segment from the plurality of segments (segments A to D) and may output processed segments A to D.

A global decision unit 250 may be included in one of the plurality of graphic cores 210 to 240. That is to say, unlike the multi core graphic processing device 100 shown in FIG. 1, the multi core graphic processing device 200 may be configured such that the global decision unit 250 is integrally formed with one of the plurality of graphic cores 210 to 240.

The plurality of graphic cores 210 to 240 may include local process units 212, 222, 232, and 242 that process the corresponding segments A to D, respectively. One of the plurality of graphic cores 210 to 240 may include a local decision unit that defines a scene property of a corresponding segment. For example, the first graphic core 210 may include a local decision unit that can generate a first local decision by defining a scene property of the first segment (segment A), and the other graphic cores 220 to 240 may not include a separate local decision unit. The first local decision may include a first local processing method that depends on the scene property of the first segment (segment A).

Since the first local decision may be equally applied to the plurality of segments (segment A to segment D) of the graphic frame, the first local decision may be the same as the global decision. In addition, the local decision unit of the first graphic core 110 may be the same as the global decision unit 250. Therefore, the plurality of segments (segments A to D) of the graphic frame may be processed by the same method as the first local processing method.

Figure 8:
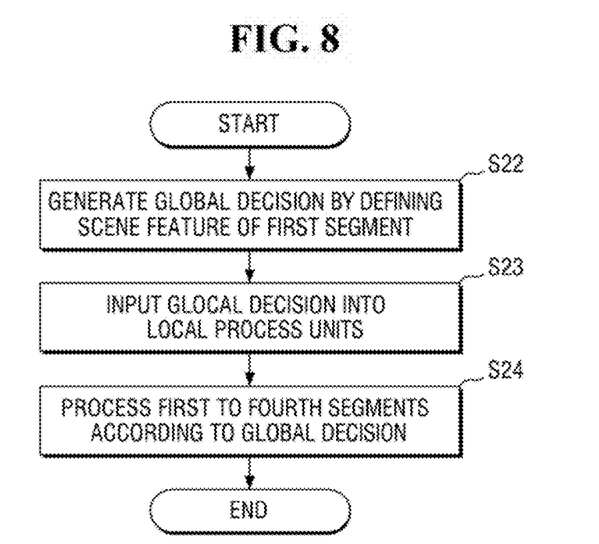
FIG. 8 is a flowchart that illustrates a graphic processing method according to another embodiment of the present disclosure.

Hereinafter, a graphic processing method according to another embodiment of the present disclosure using the multi core graphic processing device 200 shown in FIG. 7 will be described. FIG. 8 is a flowchart that illustrates a graphic processing method according to another embodiment of the present disclosure.

Referring to FIG. 8, a graphic processing method according to another embodiment of the present disclosure includes generating a global decision by defining a scene property of a first segment (segment A) (S22).

Next, the global decision is input into the local process units 212 to 242 (S23). Next, the local process units 212 to 242 respectively process the first to fourth segments (segment A to segment D) based on the global decision (S24).

Although not explicitly shown in FIG. 7, each of the plurality of graphic cores 210 to 240 may include a local decision unit that defines scene properties of the corresponding respective segments A to D.

In addition, the global decision unit 250 may be included in any one of the plurality of graphic cores 210 to 240 separately from the local decision unit. The global decision unit 250 may receive a plurality of local decisions from the plurality of graphic cores 110 to 140 and may select one of the received plurality of local decisions as a global decision. In addition, the global decision unit 250 may generate a global decision that defines a scene property of a segment corresponding to the graphic core that includes the global decision unit 250.

Figure 9:
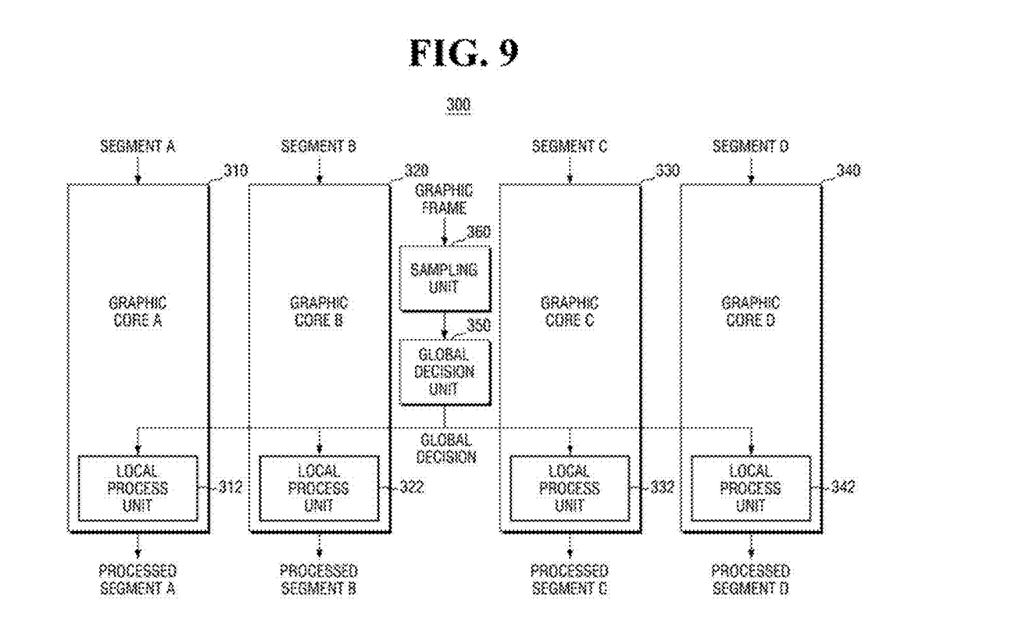
FIG. 9 is a block diagram that illustrates a multi core graphic processing device according to still another embodiment of the present disclosure.

FIG. 9 is a block diagram that illustrates a multi core graphic processing device according to still another embodiment of the present disclosure. For the sake of convenient explanation, the following description will focus on differences between the multi core graphic processing devices shown in FIGS. 1 and 9.

Referring to FIG. 9, a multi core graphic processing device 300 according to still another embodiment of the present disclosure may be a quad core graphic processing device that includes a first graphic core 310 (graphic core A), a second graphic core 320 (graphic core B), a third graphic core 330 (graphic core C), and a fourth graphic core 340 (graphic core D).

The multi core graphic processing device 300 may process a graphic frame divided into a plurality of segments (segments A to D). Each of the plurality of graphic cores 310 to 340 may receive a corresponding segment from the plurality of segments (segments A to D) and may output processed segments A to D.

A global decision unit 350 may define scene properties of the overall graphic frame. The global decision unit 350 may generate a global decision, and the global decision may be applied equally to the plurality of segments (segments A to D) of the graphic frame.

The multi core graphic processing device 300 may further include a sampling unit 360. The sampling unit 360 may receive the graphic frame and may sub-sample scene features of the graphic frame.

Figure 10:
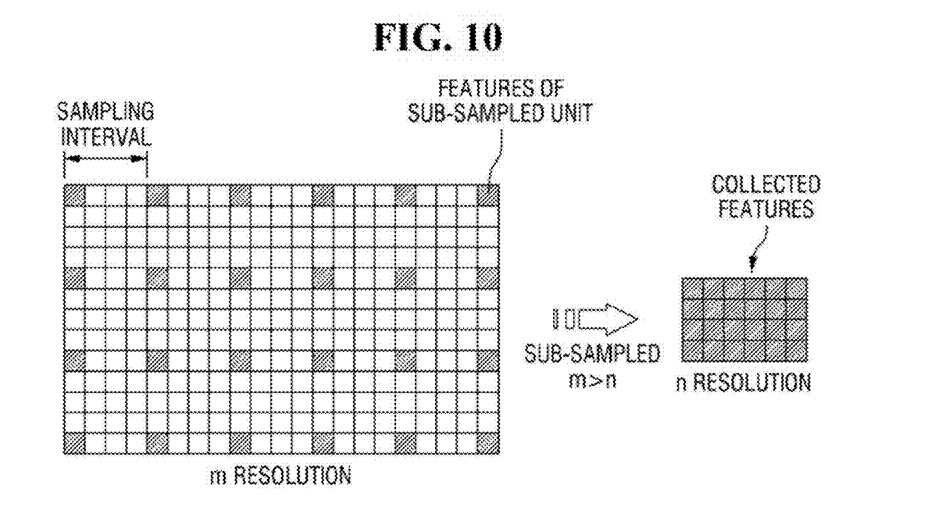
FIG. 10 is a diagram that illustrates a sub-sampling operation of a sampling unit shown in FIG. 9.

FIG. 10 is a diagram that illustrates a sub-sampling operation of a sampling unit shown in FIG. 9.

Referring to FIG. 10, the sampling unit 360 may sub-same the scene features of the graphic frame in a predetermined unit. For example, the sampling unit may be based on macro blocks (MBs), frames, clusters, but embodiments of the present disclosure are not limited thereto. For example, the sampling unit 360 may perform sampling at a sampling interval of several MBs, several frames or several clusters, but embodiments of the present disclosure are not limited thereto.

Data of the graphic frame may include scene features in units of MBs. A motion vector (MV) of each MB may indicate a motion between the previous graphic frame and the current graphic frame. Data of a plurality of graphic frames or data of one graphic data may be used with the MV. Each MB may include a plurality of scene features.

The global decision unit 350 may analyze the scene features sampled from the graphic frame. The global decision unit 350 may analyze sub-sampled scene features of m resolution levels, instead of analyzing all features of the m resolution levels. The global decision unit 350 may define scene properties of the overall graphic frame using the sampled scene features of the graphic frame.

The plurality of graphic cores 310 to 340 may include local process units 312, 322, 332 and 342 that process respective corresponding segments A to D, according to the global decision. The plurality of graphic cores 310 to 340 may not include separate local decision units to define scene properties of the corresponding segments A to D. Therefore, the plurality of segments (segments A to D) of the graphic frame may be equally processed based on the global process method.

In FIG. 9, the sampling unit 360 and the global decision unit 350 are separately provided. However, according to embodiments, the sampling unit 360 and the global decision unit 350 may be integrally formed.

Figure 11:
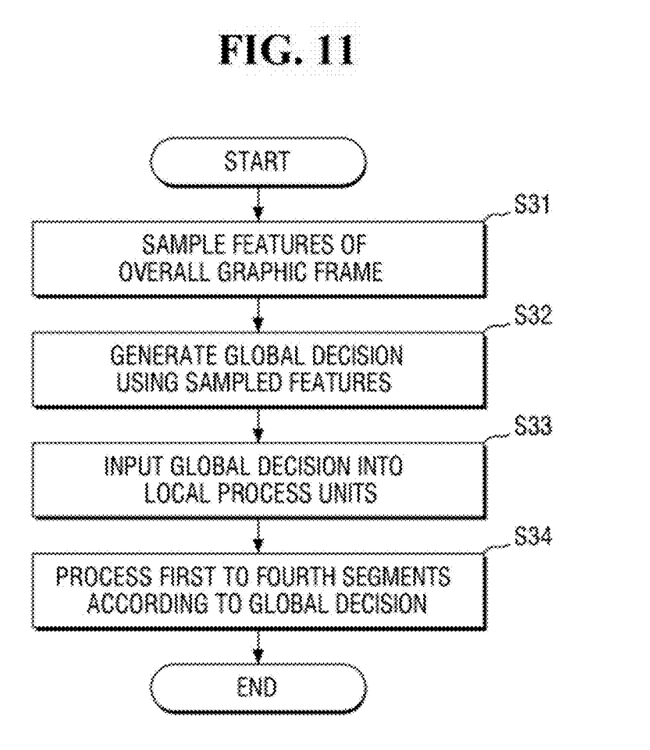
FIG. 11 is a flowchart that illustrates a graphic processing method according to still another embodiment of the present disclosure.

Hereinafter, a graphic processing method according to still another embodiment of the present disclosure using the multi core graphic processing device 300 shown in FIG. 9 will be described with reference to FIG. 11. FIG. 11 is a flowchart that illustrates a graphic processing method according to still another embodiment of the present disclosure.

Referring to FIG. 11, a graphic processing method according to still another embodiment of the present disclosure includes sampling scene features of the overall graphic frame (S31). Next, the global decision unit 350 generates a global decision using the sampled scene features (S32).

Next, the global decision unit 350 inputs the global decision into the local process units 312 to 342 (S33). Next, the local process units 312 to 342 process the first to fourth segments (segment A to segment D) based on the global decision, respectively (S34).

As described above, in multi core graphic processing devices and graphic processing methods according to embodiments of the present disclosure, even if the plurality of segments constituting a graphic frame are separately processed by different graphic cores, they may be equivalently processed based on a global decision. Therefore, boundary discontinuities between the plurality of segments may not be generated.

Figure 12:
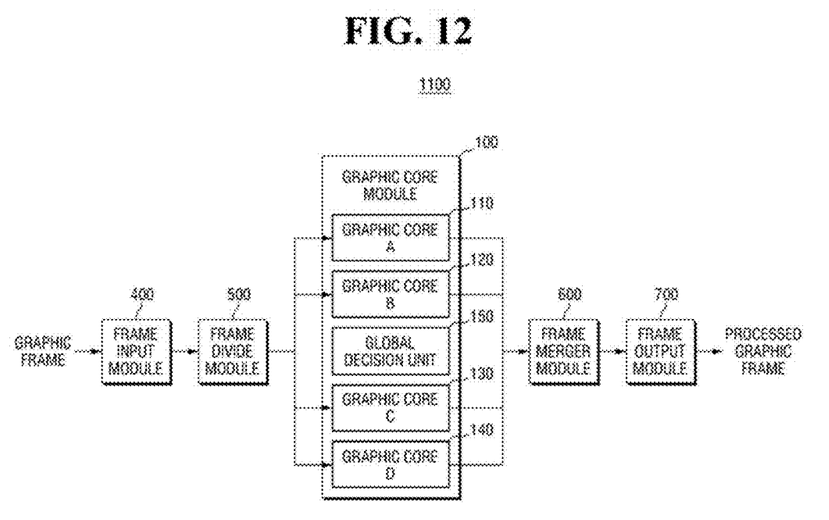
FIG. 12 is a block diagram that illustrates a multi core graphic processing system that includes a multi core graphic processing device according to embodiments of the present disclosure.

FIG. 12 is a block diagram that illustrates a multi core graphic processing system that includes a multi core graphic processing device according to embodiments of the present disclosure.

Referring to FIG. 12, a multi core graphic processing system 1100 may include a frame input module 400, a frame divide module 500, a graphic core module 100, a frame merger module 600, and a frame output module 700. The multi core graphic processing system 1100 may generate a new graphic frame by indexing two or more graphic frames.

The frame input module 400 may be configured to receive an externally provided graphic frame and to output the received graphic frame to the frame divide module 500.

The frame divide module 500 may be configured to divide the graphic frame into a plurality of segments and to output the divided plurality of segments to the graphic core module 100. The frame divide module 500 may divide the graphic frame into a plurality of strips (strip A to strip D) as shown in FIG. 2 or a plurality of tiles (tile A to tile D) as shown in FIG. 4, but embodiments of the present disclosure are not limited thereto. According to embodiments, the frame divide module 500 may divide a graphic frame in different types and numbers of segments than those shown in FIGS. 2 and 4.

The graphic core module 100 may process the plurality of segments. The graphic core module 100 includes a plurality of graphic cores 110, 120, 130, and 140 that receive a global decision from a global decision unit 150 and may equivalently process the corresponding segments based on the received global decision. The graphic core module 100 may be configured in substantially the same manner as the multi core graphic processing device 100 shown in FIG. 1.

The frame merger module 600 may be configured to merge the processed plurality of segments into one graphic frame and to output the merged graphic frame to the frame output module 700.

The frame output module 700 may be configured to receive the merged graphic frame from the frame merger module 600 and to output the processed graphic frame to an external device.

Alternatively, although not explicitly shown in FIG. 12, the graphic core module 100 may be configured in substantially the same manner as the multi core graphic processing devices 200 and 300 shown in FIGS. 7 to 9.

Figure 13:
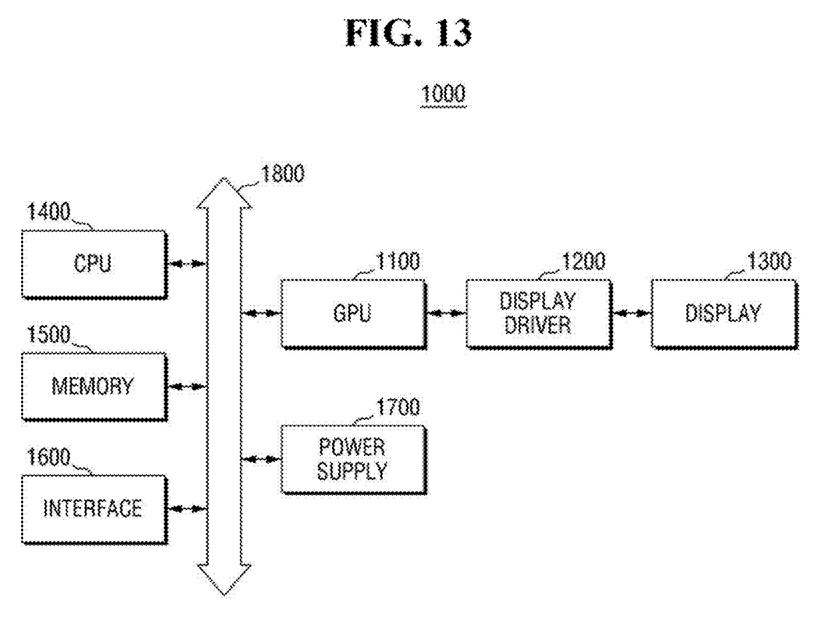
FIG. 13 is a block diagram that illustrates a computer system that includes a multi core graphic processing system as shown in FIG. 12.

FIG. 13 is a block diagram that illustrates a computer system that includes a multi core graphic processing system as shown in FIG. 12.

Referring to FIG. 13, a computer system 1000 may include a central processing unit (CPU) 1400, a memory 1500, an interface 1600, a graphic processing unit (GPU) 1100, a display driver 1200, a display 1300, and a power supply 1700.

The CPU 1400, the memory 1500, the interface 1600, the graphic processing device 1100 and the power supply 1700 may be connected to each other through a bus 1800. The bus 1800 may correspond to a path through which data moves.

The CPU 1400 may include a single processor or a plurality of processor (multi core) cores. For example, the CPU 1400 may include a multi core processor, such as a dual core processor, a quad core processor, or a hexa core processor.

The memory 1500 may be configured to store data. The memory 1500 may store data processed by the CPU 1400 or may serve as a working memory of the CPU 1400. The memory 1500 may include one or more volatile memories, such as a double data rate static DRAM (DDR SDRAM) or a single data rate static DRAM (SDR SDRAM), or one or more nonvolatile memories, such as an electrical erasable programmable ROM (EEPROM), or a flash memory.

The interface 1600 may transmit data to an external system or may receive data from the external system. The interface 1600 may be configured in a wired/wireless manner.

The GPU 1100 may process an operation associated with graphic data. The graphic data may be received from the CPU 1400 or the memory 1500. Alternatively, the graphic data may also be received from the external system through the interface 1600. The GPU 1100 may be configured in substantially the same manner as the multi core graphic processing system 1100 shown in FIG. 12, and may include a frame input module 400, a frame divide module 500, a graphic core module 100, a frame merger module 600, and a frame output module 700.

The display driver 1200 controls the display 1300 to display the graphic frame processed by the GPU 1100.

The power supply 1700 may convert an externally supplied power to supply the converted power to the CPU 1400, the memory 1500, the interface 1600, the GPU 1100, the display driver 1200, the display 1300, etc.

Although not explicitly shown in FIG. 13, the computer system 1000 may further include a graphic memory directly connected to the GPU 1100. The computer system 1000 may further include one or more input devices, such as buttons, a touch screen, a keyboard, a mouse, or a microphone or one or more output devices, such as a speaker.

According to embodiments, the computer system 1000 may be an arbitrary computer system, such as a digital TV, a mobile phone, a smart phone, a personal digital assistant (PDA), a desktop, a notebook, or a tablet.

The steps of a method or algorithm described in connection with embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium, including a network storage medium. An exemplary storage medium can be coupled to the processor so that the processor can read information from, and write information to, the storage medium. Alternatively, the storage medium can be integral to the processor. The processor and the storage medium can also reside in an application specific integrated circuit (ASIC). The ASIC can reside in a user terminal. Alternatively, the processor or the storage medium can reside in a user terminal as an individual component.

In concluding the detailed description, those skilled in the art will appreciate that many variations and modifications can be made to exemplary embodiments without substantially departing from the principles of the present disclosure. Therefore, the disclosed exemplary embodiments of the disclosure are used in a generic and descriptive sense only and not for purposes of limitation.

What is claimed is:

1. A multi core graphic processing device comprising:
   a first graphic core configured to process a first segment of a graphic frame divided into a plurality of segments and to generate a first local decision that defines a scene property of the first segment;
   a second graphic core configured to process a second segment of the graphic frame different from the first segment and to generate a second local decision that defines a scene property of the second segment; and
   a global decision unit configured to receive the first local decision and the second local decision from the first graphic core and the second graphic core, and to select one of the received first local decision and second local decision as a global decision,
   wherein the first graphic core and the second graphic core process the first segment and the second segment according to the global decision, respectively further comprising a third graphic core configured to process a third segment of the graphic frame different from the first segment and the second segment, and to generate a third local decision that defines a scene property of the third segment,
wherein the third graphic core processes the third segment according to the global decision,
wherein the global decision is selected from the majority of equivalent local decisions of the first local decisions, the second decisions and the third local decisions.

2. The multi core graphic processing device of claim 1, wherein the first graphic core and the second graphic core respectively comprise a first local decision unit and a second local decision unit, wherein each of the first local decision unit and the second local decision unit is configured to detect information from the first segment and the second segment, respectively, and to generate the first local decision and the second local decision, respectively.

3. The multi core graphic processing device of claim 1, wherein the first graphic core and the second graphic core respectively comprise a first local process unit and a second local process unite, wherein each of the first local process unit and the second local process unit is configured to process the first segment and the second segment according to the global decision, respectively.

4. A multi core graphic processing device comprising:
a frame divide module configured to divide an indexed graphics frame into a plurality of segments;
a plurality of graphic cores, each configured to receive one of the plurality of segments of the graphics frame and to process the received segment; and
a global decision unit configured to generate a global decision for the graphic frame based on one of a plurality of local decisions, wherein each local decision is generated by one of the plurality of graphic cores,
wherein each of the plurality of graphic cores is configured to generate a local decision that defines a scene property of the received segment, to transmit the generated local decision to the global decision unit, respectively, to receive the global decision and to process the received segment based on the received global decision, respectively wherein each of the plurality of graphic cores further comprises a local decision unit configured to detect information from the received segment and to generate a local decision that defines a scene property of the received segment,
wherein the global decision unit receives the local decision from each of the local decision units and selects one of the received local decisions as the global decision,
wherein the global decision unit selects a minority of local decisions of the received local decisions as the global decision, wherein the minority of local decisions from which the global decision is selected have priority over the remaining local decisions.

5. The multi core graphic processing device of claim 4, further comprising a frame merger module configured to merge the processed plurality of segments into one graphic frame and to output the merged graphic frame.

6. The multi core graphic processing device of claim 4, wherein the global decision unit is included in one of the plurality of graphic cores, and is configured to detect information from the segment received by the one graphic core and to generate the global decision that defines a scene property of the segment received by the one graphic core.

7. The multi core graphic processing device of claim 4, further comprising a sampling unit configured to receive the graphic frame and to sub-sample scene features of the received graphic frame in predetermined units, wherein the global decision unit generates the global decision using scene features sampled from the graphic frame.

8. A method of processing a graphic frame, comprising:
receiving a plurality of segments divided from a graphic frame;
generating a global decision from at least one of the plurality of segments of the graphic frame;
inputting the global decision into a plurality of local process units, wherein each of the plurality of local process units is associated with one of the plurality of segments; and
processing each segment of the plurality of segments by the respective associated local process unit according to the global decision,
wherein each segment of the plurality of segments is received by a local decision unit, each local decision unit generates a local decision by defining scene features of the respective segment of the plurality of segments, and wherein the global decision is generated by selecting one of the local decisions wherein the global decision is selected from a majority of equivalent local decisions received from each local decision unit.

9. The method of claim 8, wherein the global decision is generated by defining scene features of one segment.

10. The method of claim 8, further comprising sub-sampling scene features from the graphic frame in predetermined units, wherein the global decision is generated using the sub-sampled features.

* * * * *